(12) United States Patent
Schoenhaber et al.

(10) Patent No.: US 10,071,342 B2
(45) Date of Patent: Sep. 11, 2018

(54) THREE-WAY CATALYTIC CONVERTER

(71) Applicant: UMICORE AG & CO. KG, Hanau-Wolfgang (DE)

(72) Inventors: Jan Schoenhaber, Darmstadt (DE); Joel Despres, Rodenbach (DE); Joerg-Michael Richter, Frankfurt (DE); Martin Roesch, Rodgau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/895,304

(22) PCT Filed: May 28, 2014

(86) PCT No.: PCT/EP2014/061024
§ 371 (c)(1),
(2) Date: Dec. 2, 2015

(87) PCT Pub. No.: WO2014/195196
PCT Pub. Date: Dec. 11, 2014

(65) Prior Publication Data
US 2016/0121267 A1  May 5, 2016

(30) Foreign Application Priority Data

Jun. 3, 2013  (DE) .................. 10 2013 210 270

(51) Int. Cl.
*B01J 21/04* (2006.01)
*B01J 23/10* (2006.01)
(Continued)

(52) U.S. Cl.
CPC ......... *B01D 53/9454* (2013.01); *B01D 53/94* (2013.01); *B01D 53/9445* (2013.01);
(Continued)

(58) Field of Classification Search
CPC . B01J 23/10; B01J 23/44; B01J 23/464; B01J 23/56; B01J 23/58; B01J 23/63;
(Continued)

(56) References Cited

U.S. PATENT DOCUMENTS

| 5,010,051 A * | 4/1991 | Rudy | ................ | B01D 53/945 |
| | | | | 423/213.5 |
| 5,057,483 A * | 10/1991 | Wan | ................ | B01D 53/945 |
| | | | | 423/213.5 |

(Continued)

FOREIGN PATENT DOCUMENTS

| DE | 10 2004 029 087 A1 | 1/2005 |
| DE | 102010055147 | 6/2012 |

(Continued)

OTHER PUBLICATIONS

Autoabgaskatalysatoren, Grundlagen—Herstellung—Entwicklung—Recycling—Ökologie, Christian Hagelü, 2nd Edition, 2005, p. 27-46, 49 and 62.

(Continued)

*Primary Examiner* — Cam N. Nguyen
(74) *Attorney, Agent, or Firm* — Smith, Gambrell & Russell, LLP

(57) ABSTRACT

The present invention relates to a three-way catalytic converter for reducing harmful exhaust components of gasoline-powered internal combustion engines, and to a corresponding method for exhaust gas purification. The catalytic converter is characterized by a particularly inhomogeneous distribution of the oxygen-storing material present.

18 Claims, 6 Drawing Sheets

Figure 1A:
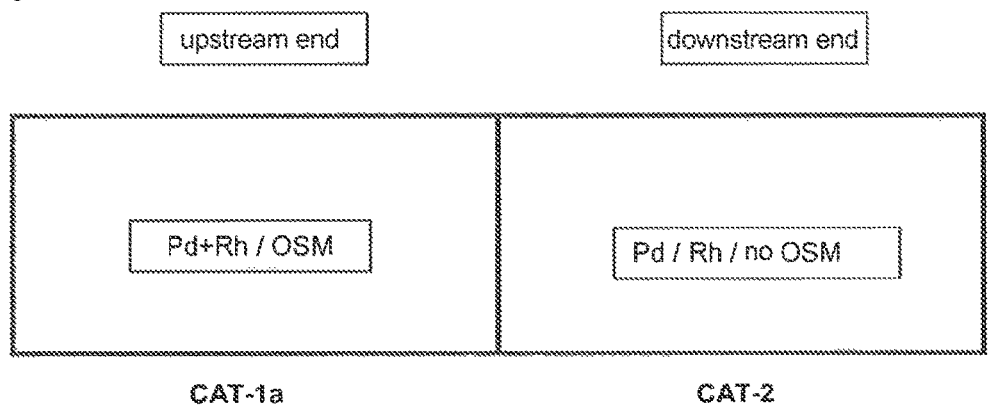

(51) Int. Cl.
*B01J 23/44* (2006.01)
*B01J 23/46* (2006.01)
*B01J 23/56* (2006.01)
*B01J 23/58* (2006.01)
*B01J 23/63* (2006.01)
*F01N 3/10* (2006.01)
*B01D 53/94* (2006.01)

(52) U.S. Cl.
CPC ...... *F01N 3/101* (2013.01); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/2092* (2013.01); *B01D 2255/20715* (2013.01); *B01D 2255/902* (2013.01); *B01D 2255/903* (2013.01); *B01D 2255/908* (2013.01); *B01D 2255/9032* (2013.01); *F01N 2510/0682* (2013.01); *F01N 2570/16* (2013.01); *Y02A 50/2324* (2018.01); *Y02T 10/22* (2013.01)

(58) Field of Classification Search
CPC .......... B01J 21/04; F01N 3/101; B01D 53/94; B01D 53/9445; B01D 53/9454
See application file for complete search history.

(56) References Cited

U.S. PATENT DOCUMENTS

| | | | | |
|---|---|---|---|---|
| 5,597,771 A * | 1/1997 | Hu | ...................... | B01D 53/945 502/303 |
| 5,948,723 A * | 9/1999 | Sung | ................... | B01D 53/945 502/302 |
| 6,087,298 A * | 7/2000 | Sung | ................... | B01D 53/945 502/333 |
| 6,497,851 B1 * | 12/2002 | Hu | ...................... | B01D 53/944 422/171 |
| 6,499,294 B1 | 12/2002 | Katoh et al. | | |
| 6,875,725 B2 | 4/2005 | Lindner et al. | | |
| 7,003,945 B2 | 2/2006 | Tamura | | |
| 7,276,212 B2 * | 10/2007 | Hu | ..................... | B01D 53/9454 422/168 |
| 7,287,370 B2 * | 10/2007 | Rajaram | ............ | B01D 53/9481 422/170 |
| 7,375,056 B2 * | 5/2008 | Wei | ...................... | B01D 53/945 502/439 |
| 7,501,098 B2 * | 3/2009 | Chen | ................... | B01D 53/945 422/177 |
| 7,517,510 B2 * | 4/2009 | Chen | ................... | B01D 53/945 422/168 |
| 7,524,465 B2 * | 4/2009 | Kumar | .................... | B01J 23/44 422/180 |
| 7,550,124 B2 * | 6/2009 | Chen | ................... | B01D 53/945 423/213.2 |
| 7,576,031 B2 * | 8/2009 | Beutel | .................... | B01J 23/44 502/326 |
| 7,622,096 B2 * | 11/2009 | Deeba | ................ | B01D 53/9445 422/168 |
| 7,749,472 B2 * | 7/2010 | Chen | ................... | B01D 53/945 423/213.2 |
| 7,758,834 B2 * | 7/2010 | Chen | ................... | B01D 53/945 423/213.2 |
| 7,785,545 B2 | 8/2010 | Miyoshi et al. | | |
| 7,795,172 B2 * | 9/2010 | Foong | ................... | B01D 53/945 502/302 |
| 7,811,962 B2 * | 10/2010 | Hu | ..................... | B01D 53/9454 502/304 |
| 7,875,573 B2 * | 1/2011 | Beutel | .................... | B01J 23/44 423/213.2 |
| 7,922,988 B2 * | 4/2011 | Deeba | .................. | B01D 53/945 422/168 |
| 7,947,238 B2 * | 5/2011 | Deeba | .................. | B01D 53/944 423/213.2 |
| 8,038,951 B2 * | 10/2011 | Wassermann | .......... | B01J 21/066 422/168 |
| 8,066,963 B2 * | 11/2011 | Klingmann | .......... | B01D 53/944 423/212 |
| 8,323,599 B2 | 12/2012 | Nunan et al. | | |
| 8,568,675 B2 * | 10/2013 | Deeba | .................. | B01D 53/945 422/177 |
| 8,603,940 B2 * | 12/2013 | Segawa | .............. | B01D 53/9422 502/325 |
| 8,637,426 B2 * | 1/2014 | Hoke | ................... | B01D 53/945 502/333 |
| 8,640,440 B2 * | 2/2014 | Klingmann | .......... | B01D 53/944 422/170 |
| 8,758,695 B2 * | 6/2014 | Neubauer | ............ | B01D 53/944 422/177 |
| 8,815,189 B2 * | 8/2014 | Arnold | ............... | B01D 46/2429 423/213.2 |
| 8,906,330 B2 * | 12/2014 | Hilgendorff | ........... | B01J 23/464 423/213.5 |
| 9,266,092 B2 * | 2/2016 | Arnold | ...................... | B01J 23/63 |
| 2004/0001781 A1 * | 1/2004 | Kumar | .................... | B01J 23/44 422/180 |
| 2004/0001782 A1 * | 1/2004 | Kumar | .................... | B01J 23/44 422/180 |
| 2004/0082470 A1 | 4/2004 | Gandhi et al. | | |
| 2009/0087365 A1 * | 4/2009 | Klingmann | .......... | B01D 53/944 423/213.5 |
| 2009/0301069 A1 | 12/2009 | Brinkmeier et al. | | |
| 2010/0293929 A1 | 11/2010 | Zhan et al. | | |
| 2011/0030346 A1 | 2/2011 | Neubauer et al. | | |
| 2011/0158871 A1 | 6/2011 | Arnold et al. | | |
| 2011/0252773 A1 | 10/2011 | Arnold et al. | | |
| 2012/0040824 A1 | 2/2012 | Itou et al. | | |

FOREIGN PATENT DOCUMENTS

| | | |
|---|---|---|
| EP | 0314057 | 5/1989 |
| EP | 0314058 | 5/1989 |
| EP | 0582971 | 2/1994 |
| EP | 0601314 | 6/1994 |
| EP | 0662862 | 5/1998 |
| EP | 0870531 | 10/1998 |
| EP | 1158146 | 11/2001 |
| EP | 1181970 | 2/2002 |
| EP | 2042225 | 4/2009 |
| EP | 2042226 | 4/2009 |
| EP | 1974809 | 9/2010 |
| EP | 2308592 | 4/2011 |
| EP | 2 324 919 A1 | 5/2011 |
| EP | 2360361 | 8/2011 |
| EP | 2431094 | 3/2012 |
| EP | 2650042 | 10/2013 |
| GB | 2342056 | 4/2000 |
| JP | 2000-154713 A | 6/2000 |
| JP | 2002-113362 A | 4/2002 |
| JP | 2002-540916 A | 12/2002 |
| JP | 2009-508049 A | 2/2009 |
| JP | 2010-510884 A | 4/2010 |
| JP | 2010-167381 A | 8/2010 |
| JP | 2010-253447 A | 11/2010 |
| WO | 96/17671 | 6/1996 |
| WO | 00/59611 A1 | 10/2000 |
| WO | 2007/031190 | 3/2007 |
| WO | 2008/000449 | 1/2008 |
| WO | 2008/067375 A1 | 6/2008 |
| WO | 2008/113445 | 9/2008 |
| WO | 2008/113457 | 9/2008 |
| WO | 2010/029978 A1 | 3/2010 |
| WO | 2012/069404 | 5/2012 |
| WO | 2012/101505 A1 | 8/2012 |

OTHER PUBLICATIONS

Catalytic Air Pollution Control, Commercial Technology, R. Heck et al., 1995, Chapter 6: Automotive Catalyst: p. 73-112.

(56) References Cited

OTHER PUBLICATIONS

Twigg, M. V. "Catalytic control of emissions from cars". Catalysis Today 2011, 163, pp. 33-41.
Rohart, O Larcher, S. Deutsch, C. Hédouin, H. Aimin, F. Fajardie, M. Allain, P. Macaudière, "From Zr-rich to Ce-rich: thermal stability of OSC materials on the whole range of composition". Topics in Catalysis. Jul. 2004, vol. 30/31, pp. 417-423.
R. Di Monte, J. Kaspar, Top. Catal. 2004, 28, 47-57.
International Search Report for PCT/EP2014/061024 dated Dec. 3, 2015 in German with English Translation (7 pages).
Written Opinion of the International Searching Authority for PCT/EP2014/061024 dated Dec. 3, 2015 in German with English Translation (13 pages).
Office Action dated Dec. 11, 2017, received in Japanese Patent Application No. JP 2016-517239 (14 pages in Japanese with English language translation).

\* cited by examiner

Fig. 2:
Fig. 2a
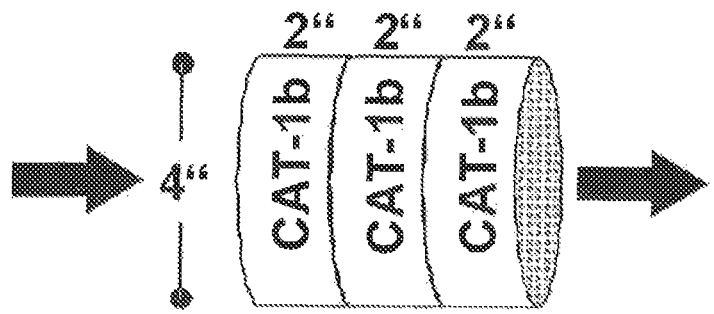
Fig. 2b
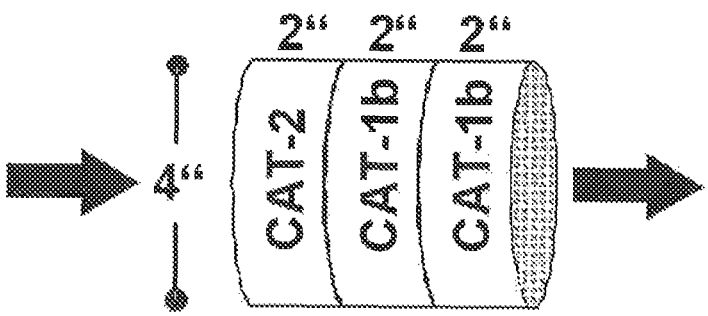
Fig. 2c
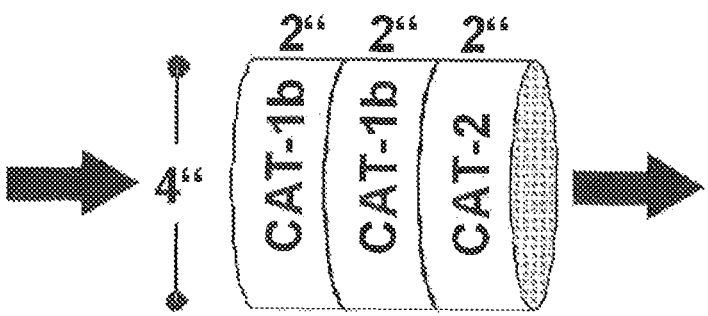

THREE-WAY CATALYTIC CONVERTER

The present invention relates to a three-way catalytic converter (TWC) for reducing harmful exhaust components of gasoline-powered internal combustion engines, and to a corresponding method for exhaust gas purification. The catalytic converter is characterized by a particularly inhomogeneous distribution of the oxygen-storing material present.

The exhaust gas of internal combustion engines typically contains the harmful gases carbon monoxide (CO) and hydrocarbons (HC), nitrogen oxides ($NO_x$) and possibly sulfur oxides ($SO_x$), as well as particulates that mostly consist of soot residues and possibly adherent organic agglomerates. CO, HC and particulates result from incomplete combustion of the fuel inside the combustion chamber of the engine. Nitrogen oxides result in the cylinder from nitrogen and oxygen in the intake air when the combustion temperatures locally exceed 1000° C. Sulfur oxides result from the combustion of organic sulfur compounds, small amounts of which are always present in non-synthetic fuels. For the removal of these emissions that are harmful for health and environment from the exhaust gases of motor vehicles, a multitude of catalytic technologies for purification of exhaust gases have been developed, the fundamental principle of which is usually based on guiding the exhaust gas that needs purification through a catalytic converter consisting of a honeycomb-like body coated with a catalytically active coating. This catalytic converter facilitates the chemical reaction of different exhaust gas components while forming non-hazardous products like carbon dioxide ($CO_2$) and water.

The mode of operation and the composition of the catalytic converters that are used can differ significantly depending on the composition of the exhaust gas to be purified and the exhaust gas temperature level that is to be expected. A number of compositions used as catalytically active coatings contain components in which, under certain operating conditions, one or more exhaust gas components can be temporarily bound and, when an appropriate change in operating conditions occurs, be intentionally released again. Components with such a capacity are generally referred to below as storage material.

For example, oxygen-storing materials in three-way catalytic converters are used to remove CO, HC and $NO_x$ from exhaust gas of gasoline engines (Otto engines) that are operated by an air/fuel mixture that is stoichiometric on average. The best-known materials for storing oxygen are mixed oxides of cerium and zirconium that may be doped with further oxides, in particular with rare earth metal oxides such as lanthanum oxide, praseodymium oxide, neodymium oxide or yttrium oxide (Autoabgaskatalysatoren, Grundlagen-Herstellung-Entwicklung-Recycling-Ökologie, Christian Hagelüken, 2nd Edition, 2005, p. 49; Catalytic Air Pollution Control, Commercial Technology, R. Heck et al., 1995, p. 73-112).

Three-way catalytic converters that contain oxygen-storing material are operated in modern gasoline engines under conditions involving a discontinuous progression of the air/fuel ratio λ. They involve a periodic change of the air/fuel ratio λ in a defined manner and thus, a periodic change of oxidizing and reducing exhaust gas conditions. This change in the air/fuel ratio λ is in both cases key for the result of the purification of exhaust gas. To this end, the lambda value of the exhaust gas is regulated with a very short cycle time (ca. 0.5 to 5 Hertz) and an amplitude Δλ of 0.005≤Δλ≤0.05 at the value λ=1 (reducing and oxidizing exhaust components are present in a stoichiometric relationship to each other). Due to the dynamic engine operation in the vehicle, deviations from this condition occur. In order for them not to have a negative effect on the purification results of exhaust gas when the exhaust gas flows over the three-way catalytic converter, the oxygen storing materials contained in the catalytic converter balance out these deviations to a certain degree by absorbing oxygen from the exhaust gas and releasing it into the exhaust gas as needed (Catalytic Air Pollution Control, Commercial Technology, R. Heck et al., 1995, p. 90).

The continually growing demands on reduction of emissions by internal combustion engines require a continuous further development of catalytic converters. In so doing, the catalytic converter's temperature stability and, of course, the extent to which the main exhaust components of the gasoline engine like hydrocarbons, carbon monoxide and nitrogen oxides are reduced is of particular importance, in addition to the start-up temperature of the catalytic converter for the conversion of the pollutants.

The optimization of the oxygen-storing capacity in three-way catalytic converters led to the proposition of concepts for inhomogeneously distributing this capability over the length of the three-way catalytic converter. In this context, layouts have been proposed with less oxygen storing capacity on the upstream end (upstream in the exhaust tract) than on the downstream end (downstream in the exhaust tract) (WO9617671A1; DE102010055147A1) as well as the opposite (U.S. Pat. No. 7,785,545B2; EP2431094A1; U.S. Pat. No. 8,323,599B2).

EP2431094A1 in particular describes a three-way catalytic converter on a supporting body with oxygen storing material and a zoned layout. Here, a two-layer catalytically active coating is proposed in a first section on the three-way catalytic converter that contains a certain amount of oxygen storing material that is bigger than the one on the downstream end of the presented catalytic converter that has only one layer of catalytically active coating. The three-way catalytic converter presented here is particularly suitable for producing less harmful $H_2S$.

However, it is made clear that it would be detrimental if the ratio of storing capacity present on the upstream end to the one present on the downstream end would fall below a certain value.

As already hinted at, the improvement of three-way catalytic converters with regard to reduction of the primary harmful gases HC, CO and NOx still presents a challenge to science. The objective of the present invention, therefore, was the presentation of a three-way catalytic converter that would, at least in the field addressed here, be superior to the catalytic converters of the prior art. In addition, it should be competitive as far as its cost of manufacture is concerned, and have a lower cost of manufacture than other three-way catalytic converters, if possible.

These and other objectives that, to a person skilled in the art, obviously arise from the prior art are fulfilled by a three-way catalytic converter according to the present claim 1. Preferred designs of the catalytic converter according to the invention are found in the sub-claims that are dependent on claim 1. Claim 7 refers to a process in which the catalytic converters according to the invention are used.

By utilizing a three-way catalytic converter for the reduction of harmful exhaust components in gasoline-operated internal combustion engines that has one or more supporting bodies that are adjacent, preferably arranged in a connected manner, with a catalytically active coating, wherein the catalytically active coating has an inhomogeneous distribution of oxygen storing capacity in the flow direction such that, on the downstream side of the catalytic converter, no oxygen storage material is present, and this area comprises a relative volume of the entire three-way catalytic converter of 5-50%, the presented objective can be met in a surprisingly easy but nonetheless very favorable way. With the catalytic converter according to the invention, it is possible to save raw material costs with comparable activity, or achieve a higher effectiveness of the catalytic converter when the raw material costs stay the same.

Fundamentally, the exhaust gas catalytic converter claimed here consists of one or several adjacent supporting bodies on which or into which—e.g. into the porous wall structures—the catalytically active coating is applied. The possible supports in this case will be clear to the experts. What is meant are so-called flow-through monoliths or particulate filters (Christian Hagelüken, "Autoabgaskatalysatoren" ["Exhaust gas catalytic converters for vehicles"], 2005, 2nd edition, p. 27-46). Such units (filters as well as flow-through monoliths) are well known to the expert—likewise when coated with a TWC-active coating (e.g. for the filters DE102010055147A1; US20100293929; US20110252773; US20110158871).

Common filter bodies known in the prior art may be made of metal and/or ceramic materials. These include, for example, metal fabric and knitted filter bodies, sintered metal bodies and foam structures from ceramic materials. Preferably, porous wall-flow filter substrates of cordierite, silicon carbide or aluminum titanate are used. These wall-flow filter substrates have inlet and outlet channels, wherein the respective downstream ends of the inflow channels and the upstream ends of the outflow channels are offset against each other and closed with gas-tight "plugs". In this case, the exhaust gas that is to be cleaned and that flows through the filter substrate is forced to pass through the porous wall between the inlet and outlet channel, which induces an excellent particulate filter effect. The filtration property for particulates can be designed by means of porosity, pore/radii distribution and the thickness of the wall. The catalytically active coating is present in and/or on the porous walls between the inlet and outlet channels. Preferably used filter substrates may be gathered from European patent application EP12164142.7, EP2042225 A1, EP2042226 A2.

In the prior art, flow-through monoliths are common catalytic converter carriers that may consist of metal or ceramic materials. Preferably, fire-proof ceramics, such as cordlerite, are used. The monoliths made from ceramics mostly have a honeycomb structure that consists of continuous channels, which is why they are also referred to as channel flow monoliths or flow-through monoliths. The exhaust gas can flow through the channels and, in doing so, comes in contact with the channel walls which are provided with a catalytically active coating. The number of channels per area is characterized by the cell density that typically ranges between 300 and 900 cells per 6.45 $cm^2$ (cells per square inch, cpsi). The wall thickness of the channel walls in ceramics is between 0.5-0.05 mm.

It should be noted that the three-way catalytic converter used here may either consist of one supporting body or of multiple individual three-way catalytic converters arranged adjacent to each other in the flow direction. Adjacent according to the invention means an arrangement in which the supporting bodies of which the three-way catalytic converter consists are arranged at a certain distance to each other, preferably in an underbody position and close to the engine, whereby most preferably no further catalytic unit is present between the supporting bodies. However, an arrangement is preferred, according to which the supporting bodies of which the three-way catalytic converter consists are positioned in a connected manner and thereby arranged one behind the other (butting). The individual supporting body is prepared in such a way that the respective catalytic coating is present on or inside the support or the supporting bodies (see EP1974809 or EP2308592 for coating on the wall and EP2042226 A2 for coating inside the wall).

The catalytically active coating used in this case consists of materials that are well known to the expert for this purpose (M. V. Twigg, Catalysis Today 2011, 163, 33-41; EP1158146A2; EP0870531A1; EP0601314A1; EP0662862A1; EP0582971A1; EP0314058 A1; EP0314057 A1). Often, the catalytic coating of three-way catalytic converters contains the metals platinum, palladium and rhodium in differing compositions that are deposited on metal oxides with a large surface area and are relatively temperature-resistant, e.g. aluminum oxide or cerium-zirconium oxide. The catalytic coating according to the invention can possibly be zoned in differing compositions and/or be present in one or more possibly differently designed catalytic coatings one over the other on the supporting body/bodies (WO08113445A1, WO08000449A2; WO08113457A1; U.S. Pat. No. 8,323,599B2).

In addition, commonly known three-way coatings often have further features such as storing capacity for hydrocarbons or nitrogen oxides (four-way catalytic converter). The present three-way catalytic converter, which may also have these cited features, contains in any case material that stores the oxygen in the exhaust gas and, as described above, is able to store the oxygen in the lean range ($\lambda>1$) and release it into the ambient medium in the rich range ($\lambda<1$). Such materials are well known to the expert (e.g.: E: Rohart, O. Larcher, S. Deutsch, C. Hédouin, H. Aimin, F. Fajardie, M. Allain, P. Macaudière, Top. Catal. 2004, 30/31, 417-423 or R. Di Monte, J. Kaspar, Top. Catal. 2004, 28, 47-57). Preferably, the material with oxygen-storing capacity that is used is selected from the group of cerium oxides or cerium-zirconium oxides and mixtures of both, wherein a distinction is made between mixed oxides that are rich in cerium and those that are low in cerium. According to the invention, this material is distributed over the length of the three-way catalytic converter in such a way that there is no oxygen-storing material at the downstream-end of the supporting body or bodies. The presence or absence of oxygen-storing materials can hereby be determined by means of the leap test. The oxygen-storing capacity of a catalytic converter or system positioned between two lambda sensors can thereby be calculated by means of the time delay of the two sensor signals occurring at air/fuel ratio leaps (Autoabgaskatalysatoren, Grundlagen-Herstellung-Entwicklung-Recycling-Ökologie, Christian Hagelüken, 2nd edition, 2005, p. 62).

The distribution of the oxygen-storing material can be configured with respect to the above conditions in such a way that the oxygen-storing capacity in the catalytic converter rises continually or in steps (e.g. by means of an increasing amount of washcoat) from the downstream end to the upstream end. An increase in steps can be achieved e.g. by applying a zoned coating arrangement in such a way that different storing materials or a different content of storing material is present in the different zones of the coating. When there is a plurality of supporting bodies, it is most appropriate to coat each one differently according to the zoned design and to arrange them directly one after the other so that the concept according to the invention is realized.

However, it is preferable to choose the stepwise concept of distributing the catalytically active coating. The downstream area of the three-way catalytic converter that should have no oxygen-storing capacity has a relative volume with respect to the entire three-way catalytic converter of 5-50%, preferably 15-45%, and especially preferably 25-40%.

As already hinted at, the three-way catalytic converter usually contains metals from the group of platinum, palladium, rhodium and mixtures of these metals. In a preferred arrangement, however, the three-way catalytic converter according to the invention contains only the metals palladium and rhodium. These are favorably arranged in such a way that not less than 2, preferably however 3, different catalytically active coatings are applied in not less than 2 areas. These not less than 2 areas are either located on a supporting body in not less than 2 separate zones, wherein the front zone or front zones display a not less than a 1-layer structure, preferably, however, a 2-layer structure, or the different areas are distributed over not less than 2 individual supporting bodies positioned one after the other according to the zoned arrangement (FIG. 1, FIG. 2). In a further preferred embodiment, the three-way catalytic converter according to the invention therefore consists of not less than 2, very preferably 3, supporting bodies connected with each other. In the case of 3 supporting bodies, the first two supporting bodies (with oxygen-storing capacity) are most favorably identical. Particularly preferably, the downstream end supporting body (without oxygen-storing capacity) has a catalytically active coating that comprises a deposit of palladium and rhodium on aluminum oxide that is stabilized with barium oxide and has a large surface (see EP1181970A1). Likewise particularly favored, the supporting body on the upstream end displays a two-layered structure, wherein the lower layer only contains palladium as a catalytically active metal and the upper layer contains palladium and rhodium. The metals within this catalytic double-coating exist as deposits on aluminum oxide with a large surface that has been possibly stabilized by lanthanum oxide, praseodymium oxide, barium oxide or yttrium oxide, and on cerium oxide, cerium-zirconium oxide with a large surface, or on cerium-zirconium oxide with a large surface that has been doped by rare earth oxides such as lanthanum oxide, praseodymium oxide, neodymium oxide or yttrium oxide (EP1974809B1).

The composition of the particularly favored catalytically active coatings is advantageously as follows:

For Catalytically Active Coating(s) with 1 Layer Zone(s) on the Upstream End:

| | | | |
|---|---|---|---|
| Pd | 0.35-8.83 g/l | preferably 1.41-7.06 g/l | particularly preferably 3.53-5.30 g/l |
| Rh | 0.04-0.71 g/l | preferably 0.07-0.35 g/l | particularly preferably 0.11-0.28 g/l |
| $Al_2O_3$ | 20-120 g/l | preferably 30-100 g/l | particularly preferably 40-90 g/l |
| OSM | 20-120 g/l | preferably 30-100 g/l | particularly preferably 40-90 g/l |

For Catalytically Active Coating(s) or Zoning(s) on the Downstream End:

| | | | |
|---|---|---|---|
| Pd | 0.35-8.83 g/l | preferably 1.41-7.06 g/l | particularly preferably 3.53-5.30 g/l |
| Rh | 0.04-0.71 g/l | preferably 0.07-0.35 g/l | particularly preferably 0.11-0.28 g/l |
| $Al_2O_3$ | 40-200 g/l | preferably 50-170 g/l | particularly preferably 70-150 g/l |
| BaO | 0-30 g/l | preferably 2-25 g/l | particularly preferably 3-20 g/l |

For Catalytically Active Coating(s) with 2 Layer Zoning(s) on the Upstream End:
Upper Layer on the Upstream End:

| | | | |
|---|---|---|---|
| Pd | 0-0.50 g/l | preferably 0.05-0.40 g/l | particularly preferably 0.10-0.30 g/l |
| Rh | 0.04-0.71 g/l | preferably 0.07-0.35 g/l | particularly preferably 0.11-0.28 g/l |
| $Al_2O_3$ | 20-120 g/l | preferably 30-100 g/l | particularly preferably 40-80 g/l |
| OSM | 20-120 g/l | preferably 25-100 g/l | particularly preferably 30-90 g/l |

Lower Layer on the Upstream End:

| | | | |
|---|---|---|---|
| Pd | 0.35-8.83 g/l | preferably 1.41-7.06 g/l | particularly preferably 3.53-5.30 g/l |
| $Al_2O_3$ | 20-120 g/l | preferably 30-100 g/l | particularly preferably 40-80 g/l |
| OSM | 20-120 g/l | preferably 25-100 g/l | particularly preferably 30-90 g/l |

For Catalytically Active Coating(s) or Zoning(s) on the Downstream End:

| | | | |
|---|---|---|---|
| Pd | 0.35-8.83 g/l | preferably 1.41-7.06 g/l | particularly preferably 3.53-5.30 g/l |
| Rh | 0.04-0.71 g/l | preferably 0.07-0.35 g/l | particularly preferably 0.11-0.28 g/l |
| $Al_2O_3$ | 40-200 g/l | preferably 50-170 g/l | particularly preferably 70-150 g/l |
| BaO | 0-30 g/l | preferably 2-25 g/l | particularly preferably 3-20 g/l |

Preferred supporting bodies are ceramic honeycomb bodies, so-called flow-through substrates, and likewise ceramic filter bodies from e.g. cordierite, as well as analogous metal supporting bodies (see above). In this case, preferably round or oval-shaped supports with a diameter of 63.5-132.1 mm and a length of 76.6-152.4 mm are used. For the realization of the concept according to the invention, one catalytic converter with two coating zones or a plurality of catalytic converters in serial arrangement with the respective coatings, both arranged close to the engine, may be used. In addition, the invention may likewise be realized by a system comprising a catalytic converter containing oxygen-storing material that is arranged close to the engine, and an OSM-free catalytic converter arranged in the underbody of the vehicle with an advantageous distance of 20-100 cm to the catalytic converter that is close to the engine. The downstream area of the three-way catalytic converter that should have no oxygen-storing capacity has a relative volume with respect to the entire catalytic converter system of 5-50%, preferably 15-45% and especially preferably 25-40%.

A further configuration of the present invention relates to a process of reducing the harmful exhaust components of gasoline-driven internal combustion engines by means of conducting the exhaust gas over a three-way catalytic converter according to the Invention. It is first noted that all the specified preferred embodiments of the three-way catalytic converter according to the Invention apply mutatis mutandis, likewise to the present process.

Within the framework of the present invention, a catalytic active coating means the washcoat, along with possible following impregnation steps, that is applied to the supporting body or bodies on the surface or inside and that basically contains the materials specified above.

Within the framework of the invention, close to the engine means a distance between the engine outlet and the catalytic converter inlet of less than 80 cm, preferably less than 60 cm and most preferably less than 50 cm. For the expert, the underbody position describes a position underneath the cab at a distance of 20-200 cm, preferably 40-150 cm and most preferably 60-100 cm from the outlet of the supporting body that is close to the engine.

The present invention demonstrates in an impressive way that even fully developed technologies like those of the three-way catalytic converter may still be improved by means of a special design of the individual functions. It can be observed that the three-way catalytic converter according to the invention that does not have a storing function for oxygen on the downstream end is clearly superior in its capacity of reducing the harmful exhaust gases CO, HC and NOx to those catalytic converters that are entirely coated with oxygen-storing material. Against the background of the known prior art, this was something that was not to be expected at all. Thus, the present method is an inventive further development with regard to the prior art.

FIGURES

FIG. 1: FIG. 1 shows the basic structure of the particularly preferred three-way catalytic converter according to the invention. In FIG. 1a, it contains the metals palladium and rhodium as catalytically active components in the layer on the upstream end. Likewise, an oxygen-storing material (OSM) is present. A supporting body with such a structure is designated by the abbreviation CAT-1a. The single layer arranged at the downstream end is produced without oxygen-supporting material and comprises the metals palladium and rhodium. This supporting body is designated as CAT-2.

Figure 1B:
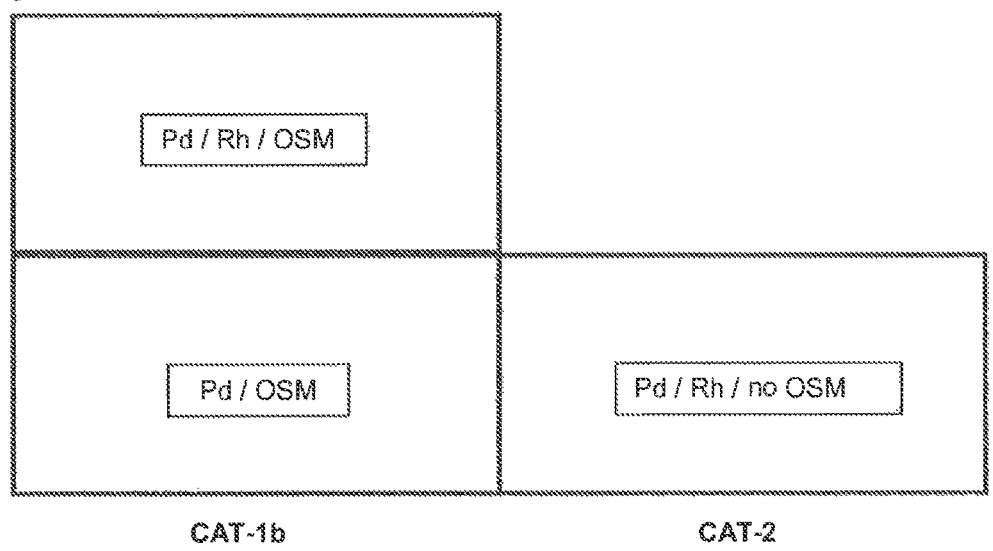

In FIG. 1b, the three-way catalytic converter according to the invention contains the metals palladium and rhodium as catalytically active components in the upper layer on the upstream end. Likewise, an oxygen-storing material (OSM) is present. The lower layer on the upstream side also has an oxygen-storing material; however, unlike the upper layer, it only contains the metal palladium. A supporting body with such a structure is designated by the abbreviation CAT-1b. The single layer arranged at the downstream end does not contain oxygen-supporting material and comprises the metals palladium and rhodium. This supporting body is—as above—designated as CAT-2.

FIG. 2: The overview displays a basic experimental setup with regard to the investigation of three-way catalytic converters. Each time, 3 slices of supporting bodies, 2 inches wide and with a diameter of 4 inches, were positioned one behind the other in the exhaust tract. FIG. 2a: Common three-way catalytic converter; FIG. 2b: Prior art (e.g. WO9617671A1); FIG. 2c: Experimental arrangement according to the invention.

Figure 3:
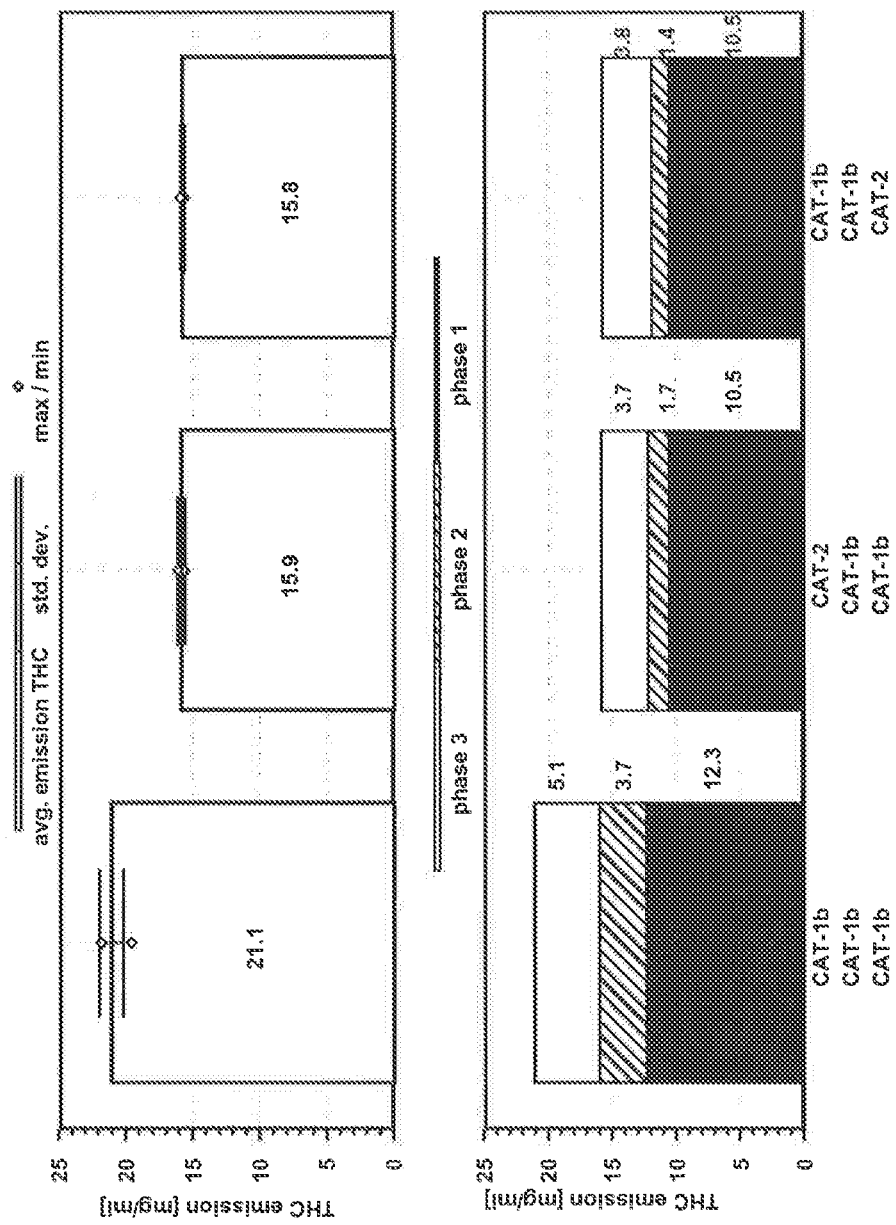

FIG. 3: The diagram in FIG. 3 shows the emission of hydrocarbons (THC) of the experimental arrangements shown in FIG. 2, 2a-2c. It is noticeable that the system according to the invention 2c (CAT-1b/CAT-1b/CAT-2) and the system 2b are better than the all OSC system 2a.

Figure 4:
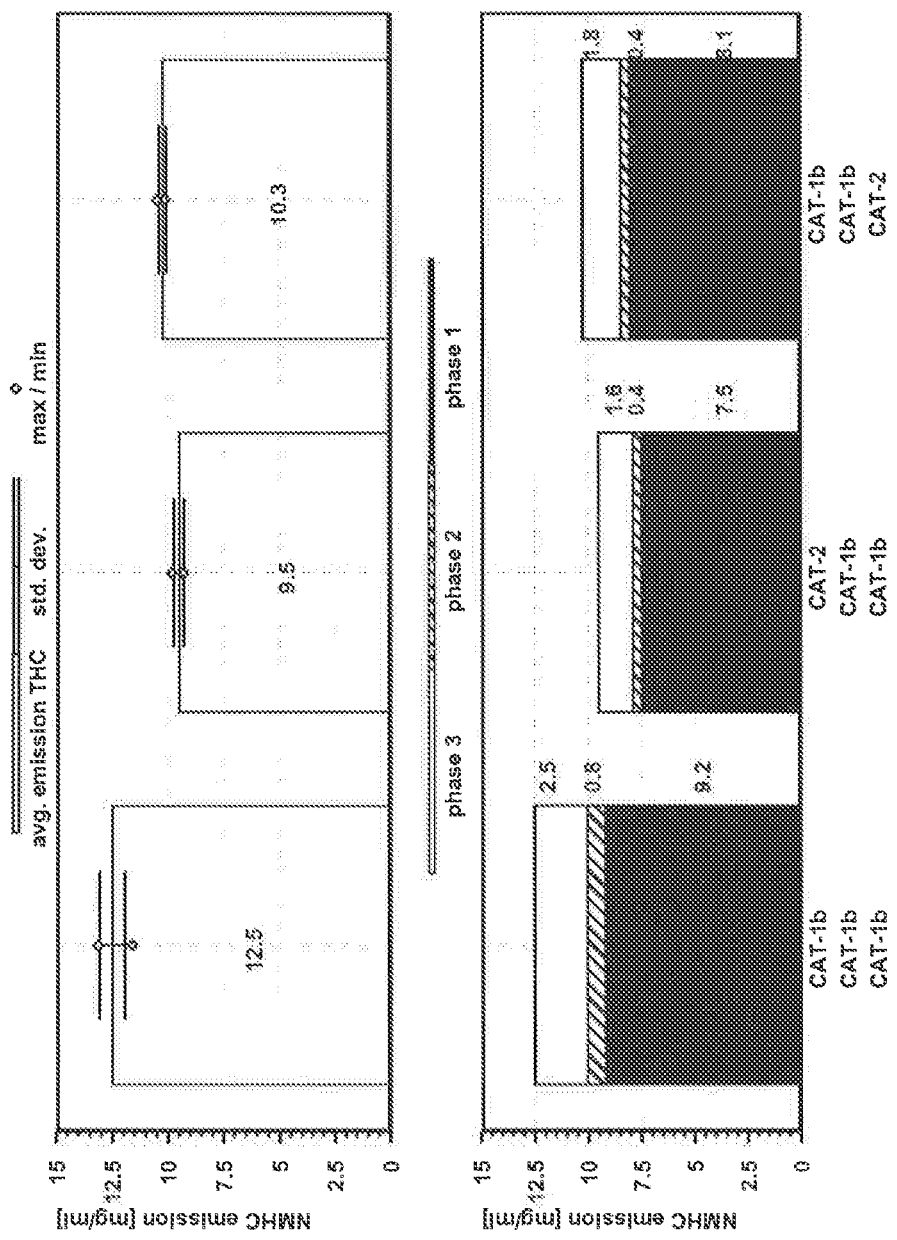

FIG. 4: The diagram in FIG. 4 shows the emission of NMHC of the experimental arrangements shown in FIG. 2, 2a-2c. Analogous to the data for THC (FIG. 3), the system according to the invention 2c (CAT-1b/CAT-1b/CAT-2) as well as system 2b show advantages compared to the all OSC system 2a.

Figure 5:
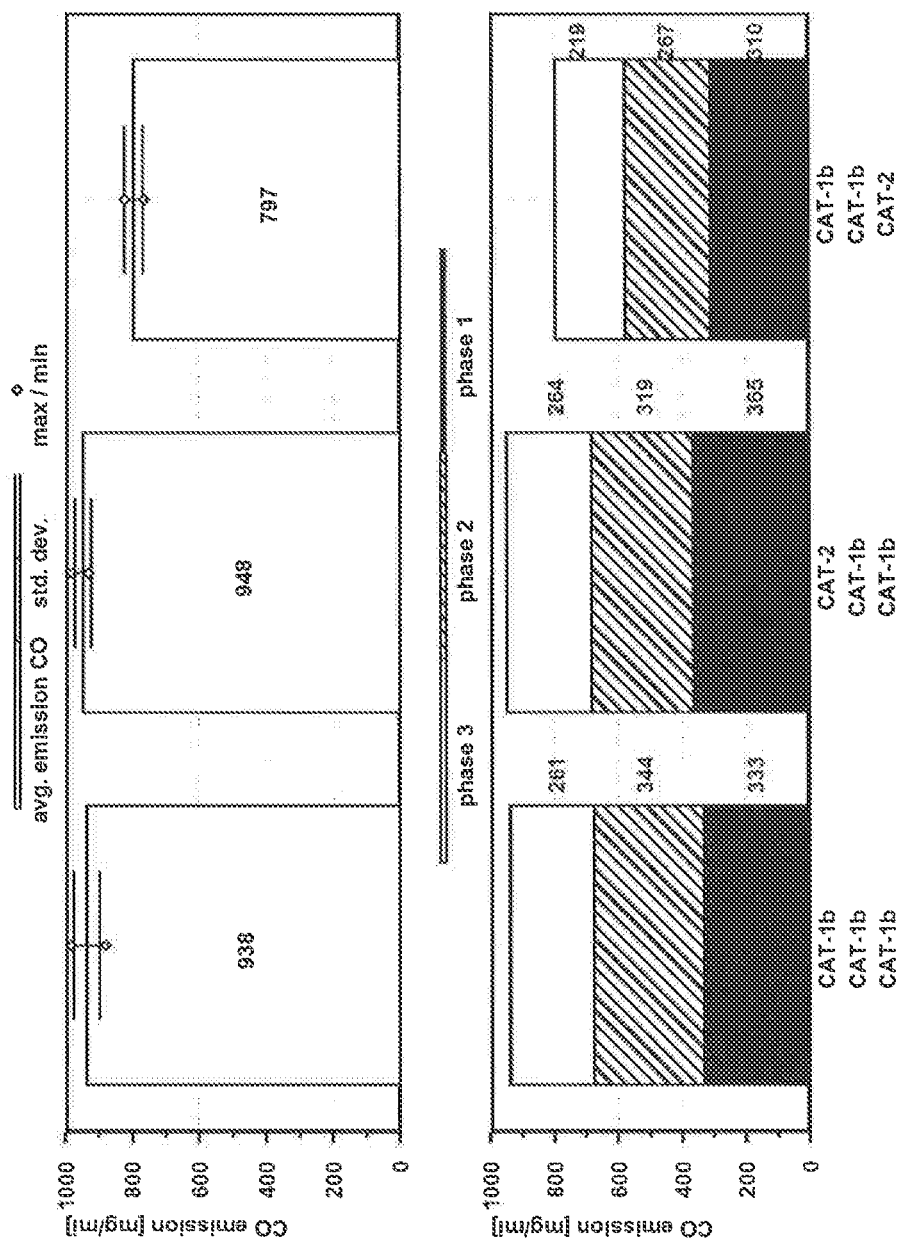

FIG. 5: Here, the results of the investigation of the systems (FIG. 2) with regard to CO emissions are displayed. Here, the system according to the invention (CAT-1b/CAT-1b/CAT-2) had the best results by far.

Figure 6:
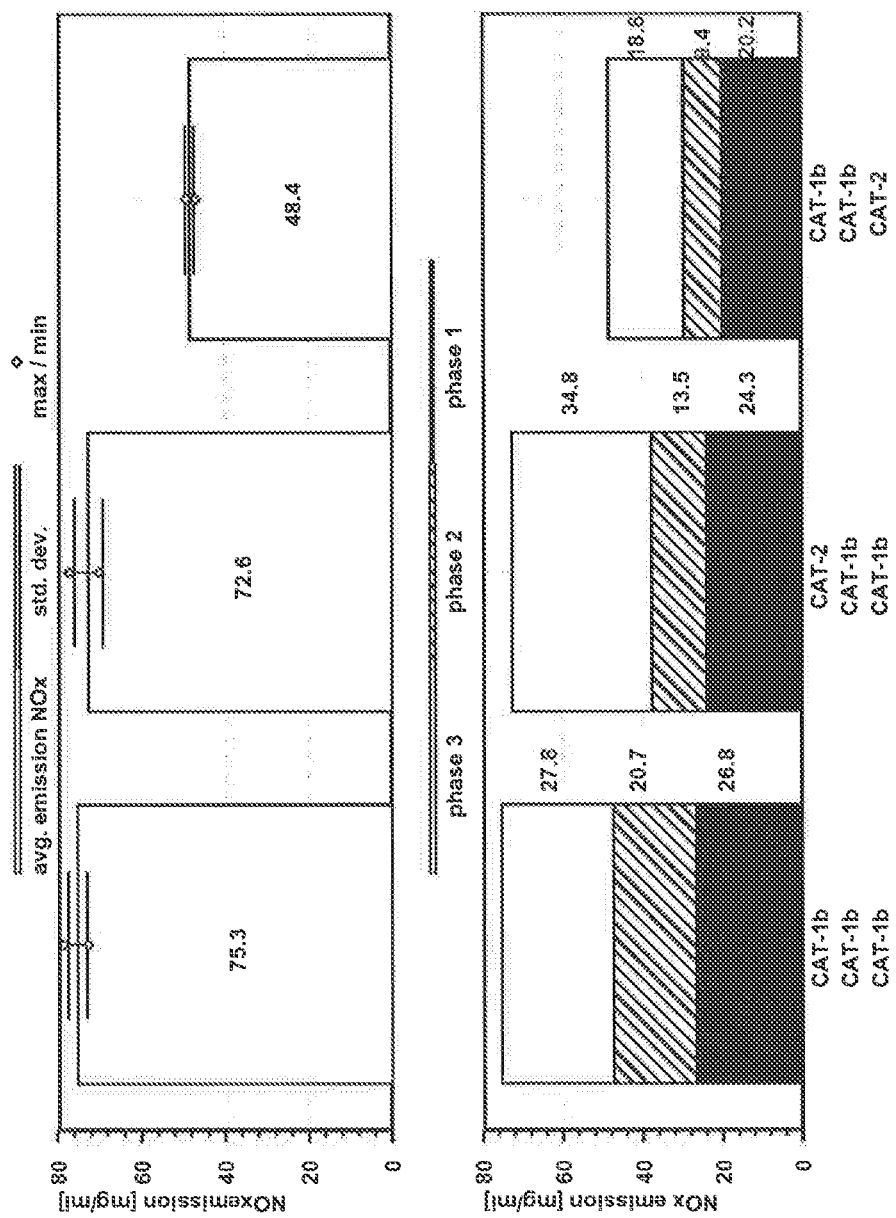

FIG. 6: This figure displays the investigation results of the systems shown in FIG. 2 with regard to NOx emissions. In this case especially, the layout 2c according to the invention shows surprisingly good results compared with the other systems 2a and 2b.

EXAMPLE

1) The ceramic substrates were coated with the different washcoats of the catalytic converters shown in FIG. 2 according to current prior art. After that, the catalytic converters were aged in a ZDAKW aging process on an engine test bench in order to simulate a mileage of 160,000 km in the vehicle. The aging is characterized by regular phases of overrun fuel cutoff, which then, with temporarily lean compositions of exhaust gas, leads to a bed temperature of over 1000° C. These conditions lead to an irreversible damage of the oxygen-storing material and the noble metals. These catalytic converters were subsequently tested on a highly dynamic engine test bench, on a current 2.0 l four cylinder application, in the dynamic FTP-75 driving cycle in a position close to the engine. The exhaust gas of the respective phases of the FTP-75 was collected in a CVS system in three different bags. After completion of the test, the bags were analyzed and weighted according to current US law. The results are displayed in FIGS. 3-6. The system 2c shows clear advantages in the area of carbon monoxide and nitrogen oxide emissions.

The invention claimed is:
1. A three-way catalytic converter for the reduction of harmful exhaust components in gasoline-operated internal combustion engines: comprising:

one body, or a plurality of adjacent supporting bodies, with a catalytically active coating, wherein the catalytically active coating has an inhomogeneous distribution of oxygen storing capacity in the flow direction, wherein on the downstream side of the three-way catalytic converter, no oxygen storing material is present, and this area comprises a relative volume of the entire three-way catalytic converter of 5-50%, and the three-way catalytic convertor is free of platinum.

2. The catalytic converter according to claim 1, wherein the catalytically active coating on the supporting body or bodies is zoned and/or applied in one or more layers onto the supporting body or bodies.

3. The catalytic converter according to claim 1, wherein the material with oxygen-storing capacity that is used is chosen from the group of cerium oxides, of cerium-zirconium oxides or doped cerium-zirconium oxides and mixtures thereof.

4. The catalytic converter according to claim 1, wherein the oxygen capacity inside the catalytic converter rises in steps or continually from the downstream end to the upstream end.

5. The catalytic converter according to claim 1, wherein the catalytically active coating comprises precious metals, the precious metals being selected from a group consisting of palladium, rhodium, and mixtures thereof.

6. The catalytic converter of claim 1 wherein the three-way catalytic converter has peak performance in a stoichiometric level in the exhaust.

7. The catalytic converter of claim 1 wherein the upstream side has, with respect to precious metal content, only palladium, rhodium or both together with the oxygen storage material, and the downstream side, which is free of oxygen storing material, has, with respect to precious metal content, only palladium, rhodium or both together.

8. The catalytic converter of claim 7 wherein the upstream side has two layers with an upper layer of those two layers having both palladium and rhodium as precious metals and a lower layer of those two layers having only palladium as the precious metal.

9. The catalytic converter of claim 8 wherein the downstream side has a single layer with that single layer having both palladium and rhodium as precious metals.

10. A method for reducing the harmful exhaust components of a gasoline-driven internal combustion engine by means of conducting the exhaust gas over a three-way catalytic converter according to claim 1.

11. A three-way catalytic converter for the reduction of harmful exhaust components in gasoline-operated internal combustion engines: comprising:

one body, or a plurality of adjacent supporting bodies, with a catalytically active coating, wherein the catalytically active coating has an inhomogeneous distribution of oxygen storing capacity in the flow direction, wherein on the downstream side of the three-way catalytic converter, no oxygen storing material is present, and this area comprises a relative volume of the entire three-way catalytic converter of 5-50%, and the catalytic converter includes not less than 2 connected supporting bodies, the supporting body on the downstream end having a catalytically active coating that comprises deposits of palladium, rhodium and barium oxide on aluminum oxide with a large surface.

12. A three-way catalytic converter for the reduction of harmful exhaust components in a gasoline-operated internal combustion engine: comprising:

one body, or a plurality of adjacent supporting bodies, with a catalytically active coating, wherein the catalytically active coating has an inhomogeneous distribution of oxygen storing capacity in the flow direction, wherein on the downstream side of the three-way catalytic converter, no oxygen storing material is present, and this area comprises a relative volume of the entire three-way catalytic converter of 5-50%, the three-way catalytic converter having a catalytic active coating that is directed towards a simultaneous reduction-oxidation in removing the harmful exhaust components, which simultaneous reduction-oxidation involves the reduction of NOx and, at the same time as that reduction, an oxidation of hydrocarbons and CO, and the three-way catalytic converter is free of platinum.

13. The catalytic converter according to claim 12, wherein the catalytically active coating on the supporting body or bodies is zoned and/or applied in one or more layers onto the supporting body or bodies.

14. The catalytic converter according to claim 12, wherein the material with oxygen-storing capacity that is used is chosen from the group of cerium oxides, of cerium-zirconium oxides or doped cerium-zirconium oxides and mixtures thereof.

15. The catalytic converter according to claim 12, wherein the catalytic converter comprises precious metals, the precious metals being selected from a group consisting of palladium, rhodium, and mixtures thereof.

16. The catalytic converter of claim 12 wherein the three-way catalytic converter has peak performance in a stoichiometric in the exhaust.

17. A method for reducing the harmful exhaust components of a gasoline-driven internal combustion engine by means of conducting the exhaust gas over a three-way catalytic converter according to claim 12.

18. A three-way catalytic converter for the reduction of harmful exhaust components in a gasoline-operated internal combustion engine: comprising:

one body, or a plurality of adjacent supporting bodies, with a catalytically active coating, wherein the catalytically active coating has an inhomogeneous distribution of oxygen storing capacity in the flow direction, wherein on the downstream side of the three-way catalytic converter, no oxygen storing material is present, and this area comprises a relative volume of the entire three-way catalytic converter of 5-50%, the three-way catalytic converter having catalytic active coating that is directed towards a simultaneous reduction-oxidation in removing the harmful exhaust components, which simultaneous reduction-oxidation involves the reduction of NOx and, at the same time as that reduction, an oxidation of hydrocarbons and CO, and the catalytic converter includes not less than 2 connected supporting bodies, the supporting body on the downstream end having a catalytically active coating that comprises deposits of palladium, rhodium and barium oxide on aluminum oxide.

* * * * *